United States Patent
Baba et al.

(10) Patent No.: US 11,141,954 B2
(45) Date of Patent: Oct. 12, 2021

(54) WET-AREA DEVICE AND METHOD FOR MANUFACTURING WET-AREA DEVICE

(71) Applicant: TOTO LTD., Kitakyushu (JP)

(72) Inventors: Tomoki Baba, Kitakyushu (JP); Satoshi Shimizu, Kitakyushu (JP); Takuma Kawasaki, Kitakyushu (JP)

(73) Assignee: TOTO LTD., Fukuoka (JP)

(*) Notice: Subject to any disclaimer, the term of this patent is extended or adjusted under 35 U.S.C. 154(b) by 0 days.

(21) Appl. No.: 17/002,957

(22) Filed: Aug. 26, 2020

(65) Prior Publication Data
US 2021/0162712 A1 Jun. 3, 2021

(30) Foreign Application Priority Data

Nov. 29, 2019 (JP) .............................. JP2019-216625
Jul. 8, 2020 (JP) .............................. JP2020-117792

(51) Int. Cl.
*E03C 1/18* (2006.01)
*B32B 15/01* (2006.01)
*E03C 1/00* (2006.01)
*B32B 15/00* (2006.01)

(52) U.S. Cl.
CPC ............ *B32B 15/013* (2013.01); *B32B 15/00* (2013.01); *E03C 1/00* (2013.01); *E03C 1/18* (2013.01); *Y10T 428/1241* (2015.01); *Y10T 428/12417* (2015.01); *Y10T 428/12472* (2015.01)

(58) Field of Classification Search
CPC . B32B 15/00; B32B 15/13; E03C 1/00; E03C 1/18; Y10T 428/1241; Y10T 428/12417; Y10T 428/12472

USPC .......................................................... 428/172
See application file for complete search history.

(56) References Cited

U.S. PATENT DOCUMENTS

| | | | | |
|---|---|---|---|---|
| 2008/0115267 A1* | 5/2008 | Konno | ...................... | E03C 1/18 4/679 |
| 2008/0166478 A1* | 7/2008 | Kameshima | ............ | C23C 30/00 427/222 |
| 2010/0127125 A1* | 5/2010 | Li | ........................... | B21B 1/227 244/119 |
| 2013/0059113 A1* | 3/2013 | Hatton | .................... | B08B 17/06 428/116 |

FOREIGN PATENT DOCUMENTS

| | | |
|---|---|---|
| JP | 2007-237541 A | 9/2007 |
| JP | 2008-106487 A | 5/2008 |

* cited by examiner

*Primary Examiner* — Humera N. Sheikh
*Assistant Examiner* — John D Schneible
(74) *Attorney, Agent, or Firm* — Pearne & Gordon LLP (57) ABSTRACT

According to one embodiment, a wet-area device includes a main part and a first layer. The first layer is provided on an outer surface of the main part. The main part includes a main part unevenness at a side of the outer surface of the main part. The main part unevenness includes a plurality of main part recesses and a plurality of main part protrusions. The first layer includes a first unevenness at a side of an outer surface of the first layer. The first unevenness includes a plurality of first recesses and a plurality of first protrusions. The first unevenness is arranged along the main part unevenness. An average height of the main part unevenness is less than an average length of the main part unevenness.

9 Claims, 8 Drawing Sheets

| SAMPLE | MAIN PART UNEVENNESS | | | GLOSSINESS | APPEARANCE |
|---|---|---|---|---|---|
| | Rc4 | RSm4 | Rc4/RSm4 | | |
| 1 | 0.4 | 53.0 | 0.008 | 502 | ×NON-MATTE |
| 2 | 0.5 | 65.0 | 0.008 | 504 | |
| 3 | 0.7 | 120.2 | 0.006 | 568 | |
| 4 | 0.7 | 55.3 | 0.013 | 411 | |
| 5 | 0.8 | 51.0 | 0.016 | 298 | |
| 6 | 1.1 | 57.8 | 0.019 | 202 | ○GLOSSY-MATTE |
| 7 | 1.3 | 62.1 | 0.021 | 153 | |
| 8 | 1.6 | 64.1 | 0.025 | 107 | |
| 9 | 2.1 | 70.2 | 0.029 | 87 | |
| 10 | 2.1 | 71.3 | 0.029 | 90 | |
| 11 | 2.5 | 78.4 | 0.032 | 62 | |
| 12 | 3.1 | 91.9 | 0.034 | 52 | |
| 13 | 3.2 | 92.1 | 0.035 | 49 | |
| 14 | 2.9 | 80.5 | 0.037 | 49 | |
| 15 | 3.7 | 93.0 | 0.040 | 46 | ×NON-GLOSSY MATTE |
| 16 | 4.0 | 101.2 | 0.040 | 46 | |
| 17 | 4.4 | 106.8 | 0.041 | 43 | |
| 18 | 4.7 | 46.6 | 0.101 | 40 | |
| 19 | 5.2 | 99.6 | 0.052 | 36 | |

FIG. 9

| SAMPLE | FIRST UNEVENNESS | | | GLOSSINESS | APPEARANCE |
|---|---|---|---|---|---|
| | Rc1 | RSm1 | Rc1/RSm1 | | |
| 1 | 0.4 | 72.4 | 0.006 | 117 | ×NON-MATTE |
| 2 | 0.5 | 51.0 | 0.010 | 97 | |
| 3 | 0.6 | 132.4 | 0.005 | 126 | |
| 4 | 0.6 | 118.9 | 0.005 | 125 | |
| 5 | 0.7 | 55.0 | 0.013 | 73 | |
| 6 | 1.0 | 66.1 | 0.016 | 43 | ○GLOSSY-MATTE |
| 7 | 1.2 | 61.5 | 0.020 | 37 | |
| 8 | 1.4 | 65.2 | 0.022 | 21 | |
| 9 | 1.9 | 69.7 | 0.027 | 17 | |
| 10 | 1.8 | 69.7 | 0.027 | 17 | |
| 11 | 2.6 | 78.6 | 0.032 | 14 | |
| 12 | 3.0 | 89.9 | 0.034 | 10 | |
| 13 | 3.5 | 105.2 | 0.033 | 11 | |
| 14 | 2.9 | 77.5 | 0.037 | 9 | |
| 15 | 4.4 | 105.9 | 0.042 | 9 | ×NON-GLOSSY MATTE |
| 16 | 3.6 | 86.2 | 0.042 | 9 | |
| 17 | 3.5 | 77.8 | 0.045 | 8 | |
| 18 | 4.1 | 37.7 | 0.109 | 2 | |
| 19 | 4.3 | 101.0 | 0.043 | 7 | |

FIG. 10

WET-AREA DEVICE AND METHOD FOR MANUFACTURING WET-AREA DEVICE

CROSS-REFERENCE TO RELATED APPLICATIONS

This application is based upon and claims the benefit of priority from Japanese Patent Application No. 2019-216625, filed on Nov. 29, 2019 and No. 2020-117792, filed on Jul. 8, 2020; the entire contents of which are incorporated herein by reference.

FIELD

Embodiments described herein relate generally to a wet-area device and a method for manufacturing a wet-area device.

BACKGROUND

A metal wet-area device such as a faucet apparatus or the like is known (e.g., JP-A 2008-106487). The outer surface of such a wet-area device has a highly glossy appearance when struck by light.

On the other hand, matting of the outer surface of the wet-area device for suppressing the glossy appearance of the outer surface is known. For example, such matting is performed by forming a fine unevenness in the outer surface of the wet-area device by shot blasting, etc.

However, when matting is performed by shot blasting or the like, there are cases where the height (the depth) of the unevenness formed in the outer surface of the wet-area device undesirably becomes too large. When the height of the unevenness formed in the outer surface of the wet-area device is too large, it is difficult to remove the water that collects in the unevenness, and the adhesion of grime to the outer surface of the wet-area device easily becomes a problem.

SUMMARY

According to the embodiment, a wet-area device includes a main part and a first layer. The main part is made of metal. The first layer is provided on an outer surface of the main part. The main part includes a main part unevenness at a side of the outer surface of the main part. The main part unevenness includes a plurality of main part recesses and a plurality of main part protrusions. The first layer includes a first unevenness at a side of an outer surface of the first layer. The first unevenness includes a plurality of first recesses and a plurality of first protrusions. The first unevenness is arranged along the main part unevenness. An average height of the main part unevenness is less than an average length of the main part unevenness.

DETAILED DESCRIPTION

A first invention is a wet-area device including a main part made of metal, and a first layer provided on an outer surface of the main part; the main part includes a main part unevenness that includes multiple main part recesses and multiple main part protrusions and is formed at a side of the outer surface of the main part; the first layer includes a first unevenness that includes multiple first recesses and multiple first protrusions and is arranged along the main part unevenness at a side of an outer surface of the first layer; and an average height of the main part unevenness is less than an average length of the main part unevenness.

According to this wet-area device, the glossy appearance of the outer surface of the wet-area device can be matted so as not to be too glossy because the main part includes the main part unevenness and the first layer includes the first unevenness along the main part unevenness. Also, by setting the average height of the main part unevenness to be less than the average length of the main part unevenness, the glossy appearance of the outer surface of the wet-area device can be matted so as not to be too glossy, and the height of the unevenness of the outer surface of the wet-area device can be prevented from becoming too large. Thereby, the adhesion of grime due to the unevenness can be suppressed while suppressing the glossy appearance of the outer surface by matting.

A second invention is the wet-area device of the first invention, wherein the average height of the main part unevenness is greater than 0.8 µm, and a ratio of the average height of the main part unevenness to the average length of the main part unevenness is greater than 0.01 and less than 0.05.

According to this wet-area device, by setting the average height of the main part unevenness to be in this range, the height of the unevenness of the outer surface of the wet-area device can be prevented from becoming too large or too small. Thereby, a moderate glossy appearance (gloss) can remain while suppressing the glossy appearance of the outer surface by matting.

A third invention is the wet-area device of the second invention, wherein the ratio of the average height of the main part unevenness to the average length of the main part unevenness is greater than 0.016 and less than 0.040.

According to this wet-area device, by setting the ratio of the average height of the main part unevenness to the average length of the main part unevenness to be in this range, the height of the unevenness of the outer surface of the wet-area device can be further prevented from becoming too large or too small. Thereby, an appearance that is both glossy and matte can be realized at the outer surface of the wet-area device.

A fourth invention is the wet-area device of the third invention, wherein the ratio of the average height of the main part unevenness to the average length of the main part unevenness is not less than 0.019 and not more than 0.037.

According to this wet-area device, by setting the ratio of the average height of the main part unevenness to the average length of the main part unevenness to be in this range, the height of the unevenness of the outer surface of the wet-area device can be further prevented from becoming too large or too small. Thereby, an appearance that is both glossy and matte can be realized at the outer surface of the wet-area device.

A fifth invention is the wet-area device of any one of the first to fourth inventions, wherein an average height of the first unevenness is greater than 0.7 μm, and a ratio of the average height of the first unevenness to an average length of the first unevenness is greater than 0.01 and less than 0.05.

According to this wet-area device, by setting the average height of the first unevenness to be in this range, the height of the unevenness of the outer surface of the wet-area device can be prevented from becoming too large or too small. Thereby, a moderate glossy appearance (gloss) can remain while suppressing the glossy appearance of the outer surface by matting.

A sixth invention is the wet-area device of the fifth invention, wherein the ratio of the average height of the first unevenness to the average length of the first unevenness is greater than 0.013 and less than 0.042.

According to this wet-area device, by setting the ratio of the average height of the first unevenness to the average length of the first unevenness to be in this range, the height of the unevenness of the outer surface of the wet-area device can be further prevented from becoming too large or too small. Thereby, an appearance that is both glossy and matte can be realized at the outer surface of the wet-area device.

A seventh invention is the wet-area device of the sixth invention, wherein the ratio of the average height of the first unevenness to the average length of the first unevenness is not less than 0.016 and not more than 0.037.

According to this wet-area device, by setting the ratio of the average height of the first unevenness to the average length of the first unevenness to be in this range, the height of the unevenness of the outer surface of the wet-area device can be further prevented from becoming too large or too small. Thereby, an appearance that is both glossy and matte can be realized at the outer surface of the wet-area device.

An eighth invention is the wet-area device of any one of the first to seventh inventions, wherein the average height of the main part unevenness is greater than a thickness of the first layer.

According to this wet-area device, by setting the average height of the main part unevenness to be greater than the thickness of the first layer, the first unevenness can be formed better along the main part unevenness. Thereby, it is easy to adjust the glossy appearance of the outer surface in a moderate range.

A ninth invention is the wet-area device of any one of the first to eighth inventions, further including a second layer provided between the main part and the first layer, wherein a hardness of the second layer is less than a hardness of the first layer, and the second layer includes a second unevenness that includes multiple recesses and multiple protrusions and is formed along the main part unevenness in an outer surface side of the second layer.

According to this wet-area device, when the second layer is provided, the first unevenness can reflect the main part unevenness via the second unevenness because the second layer includes the second unevenness along the main part unevenness; therefore, the adhesion of grime due to the unevenness can be suppressed while suppressing the glossy appearance of the outer surface by matting.

A tenth invention is a method for manufacturing the wet-area device of the first invention, including an unevenness formation process of forming the main part unevenness including the multiple main part recesses and the multiple main part protrusions at the side of the outer surface of the main part that is made of metal by shot blasting the outer surface of the main part, and a first layer formation process of forming the first layer on the outer surface of the main part where the main part unevenness is formed; an average height of the main part unevenness is less than an average length of the main part unevenness in the unevenness formation process; and the first layer formation process forms the first layer so that the first unevenness includes the multiple first recesses and the multiple first protrusions and is arranged along the main part unevenness at the side of the outer surface of the first layer.

According to the method for manufacturing the wet-area device, the glossy appearance of the outer surface of the wet-area device can be matted so as not to be too glossy by forming the main part unevenness in the main part and by forming the first unevenness along the main part unevenness in the first layer. Also, by setting the average height of the main part unevenness to be less than the average length of the main part unevenness, the glossy appearance of the outer surface of the wet-area device can be matted so as not to be too glossy, and the height of the unevenness of the outer surface of the wet-area device can be prevented from becoming too large.

Thereby, a wet-area device can be provided in which the adhesion of grime due to the unevenness can be suppressed while suppressing the glossy appearance of the outer surface by matting.

Embodiments of the invention will now be described with reference to the drawings. Similar components in the drawings are marked with the same reference numerals, and a detailed description is omitted as appropriate.

Figure 1:
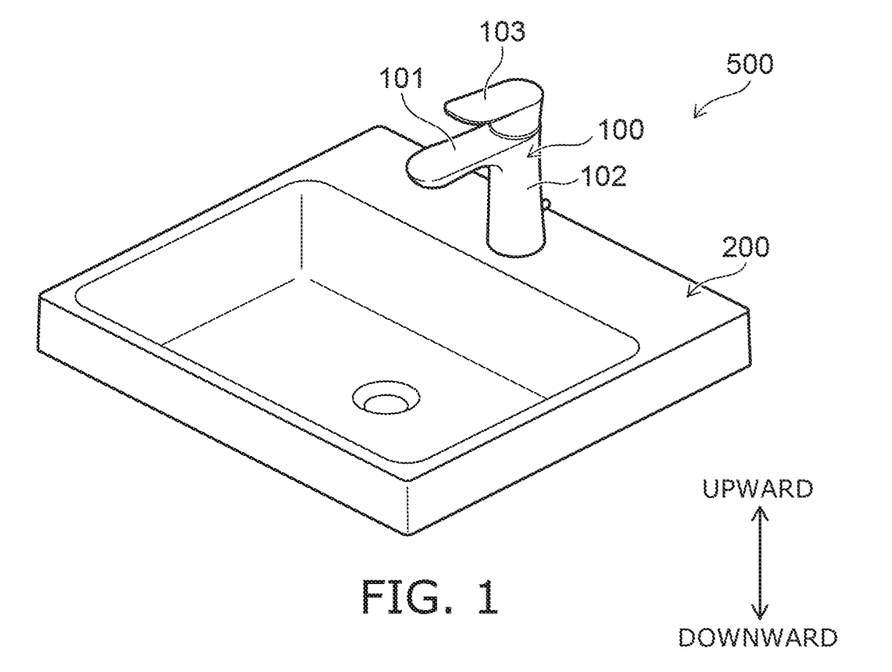
FIG. 1 is a perspective view schematically illustrating a wet-area equipment including a wet-area device according to the embodiment.

FIG. 1 is a perspective view schematically illustrating a wet-area equipment including a wet-area device according to the embodiment.

As illustrated in FIG. 1, the wet-area equipment 500 according to the embodiment includes the wet-area device 100 and a bowl 200. The wet-area device 100 is, for example, a device including a flow channel inside which water flows. The wet-area device 100 may be a device that is used at the periphery of a device including a flow channel inside which water flows and has a possibility of being contacted by water.

In the example, the wet-area device 100 is a faucet apparatus. The wet-area device 100 includes a water discharger 101, a supporter 102, and an operation part 103. The water discharger 101 discharges water toward the bowl 200 positioned below the water discharger 101. The supporter 102 is provided below the water discharger 101. The supporter 102 is fixed to the upper surface of the bowl 200 at the lower end of the supporter 102 and supports the water discharger 101. A flow channel in which water flows is provided inside the water discharger 101 and the supporter 102. The operation part 103 is a lever provided above the water discharger 101. By operating the operation part 103, a user can discharge and stop the discharge of water from the water discharger 101, perform a temperature regulation and/or a flow regulation of the discharged water, etc.

The wet-area device 100 is not limited to a faucet apparatus and may be, for example, a drainage metal fitting mounted to the bowl 200, a handrail provided in a bath room, a toilet paper holder provided for a toilet, a handle provided in a kitchen, etc.

Figure 2:
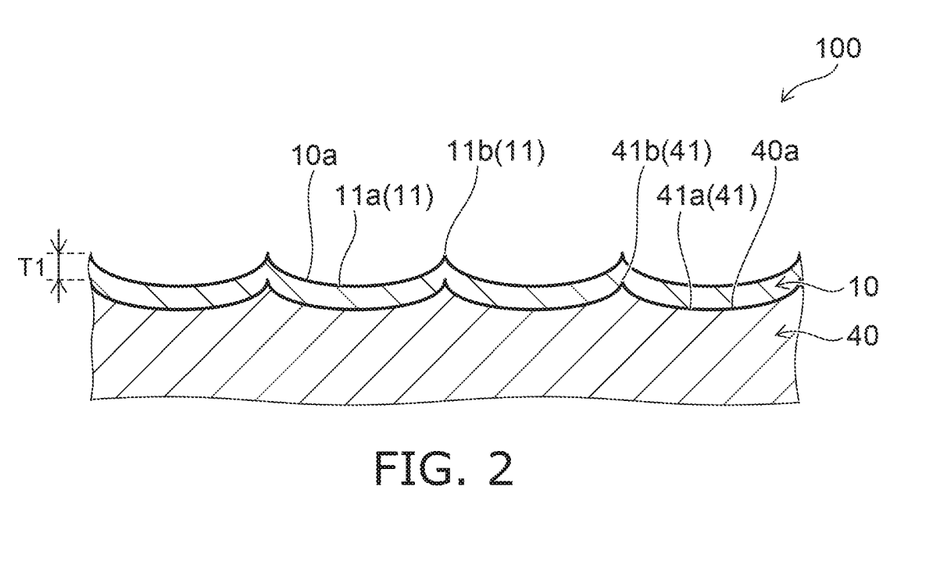
FIG. 2 is a cross-sectional view schematically illustrating the outer surface vicinity of a wet-area device according to a first embodiment.

FIG. 2 is a cross-sectional view schematically illustrating the outer surface vicinity of a wet-area device according to a first embodiment.

As illustrated in FIG. 2, the wet-area device 100 according to the first embodiment includes a main part 40 and a first layer 10.

The main part 40 is made of metal. The main part 40 includes, for example, stainless steel, etc.

The main part 40 includes a main part unevenness 41 in an outer surface 40a side. The main part unevenness 41 is provided at a side of the outer surface 40a of the main part 40. The main part unevenness 41 includes multiple recesses 41a (main part recesses) and multiple protrusions 41b (main part protrusions). The recesses 41a of the main part unevenness 41 are recessed in the stacking direction. The protrusions 41b of the main part unevenness 41 protrude in the stacking direction. Here, the "stacking direction" is a direction connecting the main part 40 and the first layer 10. That is, the stacking direction is a direction orthogonal to the outer surface 40a of the main part 40.

The first layer 10 is provided on the outer surface 40a of the main part 40. In other words, the first layer 10 is provided outward of the outer surface 40a of the main part 40. For example, the first layer 10 is positioned at the outermost surface.

The first layer 10 may be directly provided on the outer surface 40a of the main part 40 or may be indirectly provided on the outer surface 40a of the main part 40 with another layer (e.g., a second layer 20 and/or a third layer 30 described below) interposed. That is, the first layer 10 may contact the outer surface 40a of the main part 40 or may not contact the outer surface 40a of the main part 40. In the example, the first layer 10 contacts the outer surface 40a of the main part 40.

For example, the first layer 10 is made of metal. The first layer 10 includes, for example, chromium carbonitride, chrome, nickel, a tin-cobalt alloy, gold, etc. When the first layer 10 includes chromium carbonitride, the first layer 10 is, for example, black.

In such a case, for example, the outer surface of the wet-area device 100 can be colored by providing the first layer 10. In other words, in such a case, for example, the first layer 10 functions as a colored layer. When the first layer 10 includes chrome, nickel, a tin-cobalt alloy, gold, etc., the wear resistance of the wet-area device 100 can be improved by providing the first layer 10, and the outer surface of the wet-area device 100 can be provided with metallic luster.

The first layer 10 includes a first unevenness 11 in an outer surface 10a side. The first unevenness 11 is provided at a side of the outer surface 10a of the first layer 10. The first unevenness 11 includes multiple recesses 11a (first recesses) and multiple protrusions 11b (first protrusions). The recesses 11a of the first unevenness 11 are recessed in the stacking direction. The protrusions 11b of the first unevenness 11 protrude in the stacking direction.

The first unevenness 11 is along the main part unevenness 41. The first unevenness 11 is arranged along the main part unevenness 41. In other words, the first unevenness 11 follows the main part unevenness 41. That is, the recesses 11a of the first unevenness 11 overlap the recesses 41a of the main part unevenness 41 in the stacking direction. Also, the protrusions 11b of the first unevenness 11 overlap the protrusions 41b of the main part unevenness 41 in the stacking direction.

Thus, the glossy appearance of the outer surface of the wet-area device 100 can be matted so as not to be too glossy because the main part 40 includes the main part unevenness 41 and the first layer 10 includes the first unevenness 11 along the main part unevenness 41.

A thickness T1 of the first layer 10 is, for example, not less than 0.1 μm and not more than 3.0 μm (e.g., about 1 μm).

Here, "thickness" is the length in the stacking direction. For example, the thickness can be calculated as the average value of lengths in the stacking direction at multiple locations in a cross-sectional image obtained with a scanning electron microscope (SEM).

It is sufficient for the first layer 10 to be provided on at least a portion of the outer surface 40a of the main part 40, and it is favorable to be provided on the entire surface of the outer surface 40a of the main part 40.

It is sufficient for the main part unevenness 41 to be provided in at least a portion of the outer surface 40a side of the main part 40, and it is favorable to be provided on the entire surface of the outer surface 40a side of the main part 40. It is sufficient for the first unevenness 11 to be provided in at least a portion of the outer surface 10a side of the first layer 10, and it is favorable to be provided on the entire surface of the outer surface 10a side of the first layer 10.

The unevenness of each component will now be described in more detail.

Figure 3:
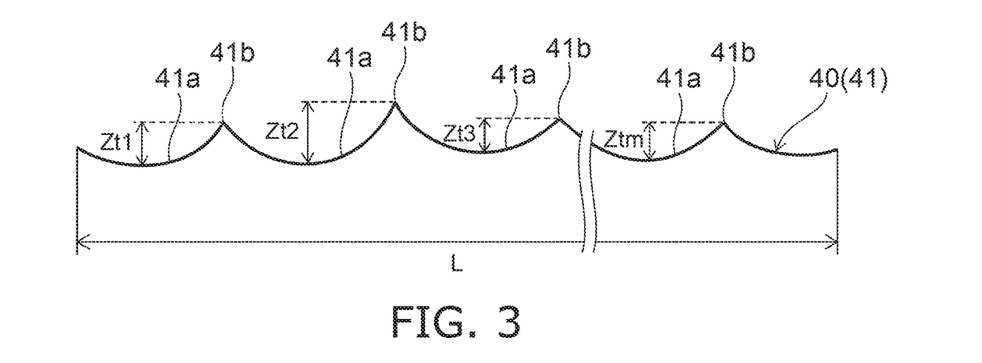
FIG. 3 is a schematic view illustrating an average height Rc of an unevenness.

FIG. 3 is a schematic view illustrating an average height Rc of an unevenness.

Although the average height Rc (Rc4) of the main part unevenness 41 of the main part 40 is described as an example in FIG. 3, an average height Rc1 of the first unevenness 11 of the first layer 10 also can be calculated similarly to the average height Rc4 of the main part unevenness 41. An average height Rc2 of a second unevenness 21 of the second layer 20 described below and an average height Rc3 of a third unevenness 31 of the third layer 30 also can be calculated similarly to the average height Rc4 of the main part unevenness 41.

As illustrated in FIG. 3, the average height Rc of the unevenness is the average value of a height Zti of each contour curve element along a reference length L and is represented by Formula (1) recited below. The "contour curve element" is one set of a recess and a protrusion that are next to each other. More specifically, for example, as illustrated in FIG. 3, the average height Rc is the average value of heights Zt1 to Ztm of m contour curve element included within the reference length L, wherein the height Zti (e.g., Zt1, Zt2, Zt3, Ztm, etc.) of each contour curve element is the length in the stacking direction from the bottom of one recess 41a included in the main part unevenness 41 of the main part 40 to the apex of the protrusion 41b next to the recess 41a. The average height Rc conforms to JIS B 0601:2001.

[Formula 1]

$$R_c = \frac{1}{m}\sum_{i=1}^{m} Zti \qquad (1)$$

Figure 4:
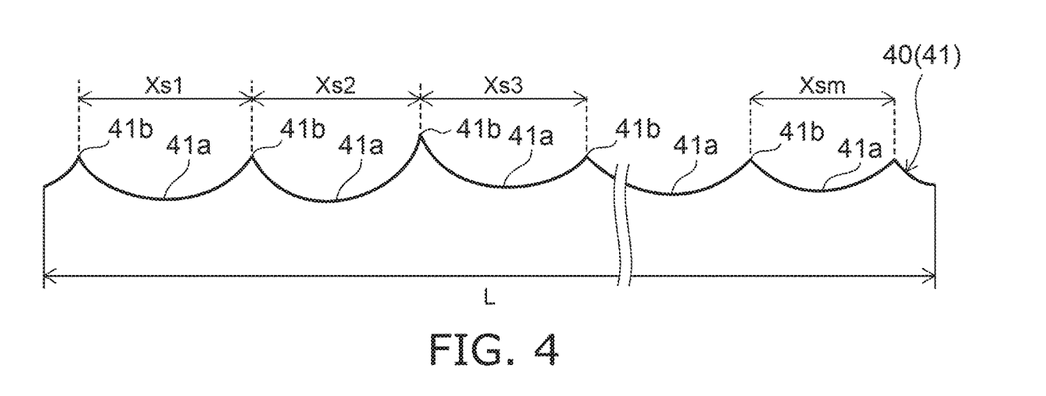
FIG. 4 is a schematic view illustrating an average length RSm of the unevenness.

FIG. 4 is a schematic view illustrating an average length RSm of the unevenness.

Although the average length RSm (RSm4) of the main part unevenness 41 of the main part 40 is described as an example in FIG. 4, an average length RSm1 of the first unevenness 11 of the first layer 10 also can be calculated similarly to an average length RSm4 of the main part unevenness 41. An average length RSm2 of the second unevenness 21 of the second layer 20 and an average length RSm3 of the third unevenness 31 of the third layer 30 that are described below also can be calculated similarly to the average length RSm4 of the main part unevenness 41.

As illustrated in FIG. 4, the average length RSm of the unevenness is the average value of a length Xsi of each contour curve element along the reference length L and is represented by Formula (2) recited below. More specifically, for example, as illustrated in FIG. 4, the average length RSm is the average value of lengths Xs1 to Xsm of m contour curve elements the m contour curve element included within the reference length L, wherein the length Xsi (e.g., Xs1, Xs2, Xs3, etc.) of each contour curve element is the length in the measurement direction (a direction orthogonal to the stacking direction) from the apex of one protrusion 41b included in the main part unevenness 41 of the main part 40 to the apex of the protrusion 41b next to the protrusion 41b. The average length RSm conforms to JIS B 0601:2001.

[Formula 2]

$$RSm = \frac{1}{m}\sum_{i=1}^{m} Xsi \qquad (2)$$

For example, the average height Rc of the unevenness and the average length RSm can be measured using the surface roughness tester SV-3200L4 manufactured by Mitutoyo.

The average height Rc4 of the main part unevenness 41 is less than the average length RSm4 of the main part unevenness 41. That is, the average value of the depths (the heights) of the multiple recesses 41a included in the main part unevenness 41 is less than the average value of the widths of the multiple recesses 41a included in the main part unevenness 41.

Thus, by setting the average height Rc4 of the main part unevenness 41 to be less than the average length RSm4 of the main part unevenness 41, the glossy appearance of the outer surface of the wet-area device 100 can be matted so as not to be too glossy, and the height of the unevenness of the outer surface of the wet-area device 100 can be prevented from becoming too large. Thereby, the adhesion of grime due to the unevenness can be suppressed while suppressing the glossy appearance of the outer surface by matting.

It is sufficient for the average height Rc4 of the main part unevenness 41 to be less than the average length RSm4 of the main part unevenness 41 for at least a portion of the main part 40, and it is favorable for the average height Rc4 of the main part unevenness 41 to be less than the average length RSm4 of the main part unevenness 41 for the entire main part 40. When the wet-area device 100 is a faucet apparatus, for example, it is favorable to perform matting so that the average height Rc4 of the main part unevenness 41 is less than the average length RSm4 of the main part unevenness 41 for the upper surface of the water discharger 101, the upper surface of the operation part 103, the front and side surfaces of the supporter 102, etc., that are easily viewable by the user.

The average height Rc4 of the main part unevenness 41 is, for example, greater than 0.8 μm, and favorably greater than 0.8 μm and less than 3.7 μm. The average length RSm4 of the main part unevenness 41 is, for example, not less than 40 μm and not more than 200 μm, and favorably greater than 51.0 μm and less than 93.0 μm. The ratio (Rc4/RSm4) of the average height Rc4 of the main part unevenness 41 to the average length RSm4 of the main part unevenness 41 is, for example, greater than 0.01 and less than 0.05.

By setting the average height Rc4 of the main part unevenness 41 to be in this range, the height of the unevenness of the outer surface of the wet-area device 100 can be prevented from becoming too large or too small. Thereby, a moderate glossy appearance (gloss) can remain while suppressing the glossy appearance of the outer surface by matting.

It is favorable for the ratio (Rc4/RSm4) of the average height Rc4 of the main part unevenness 41 to the average length RSm4 of the main part unevenness 41 to be greater than 0.016 and less than 0.040, and more favorably not less than 0.019 and not more than 0.037.

By setting the ratio of the average height Rc4 of the main part unevenness 41 to the average length RSm4 of the main part unevenness 41 to be in this range, the height of the unevenness of the outer surface of the wet-area device 100 can be further prevented from becoming too large or too small. Thereby, an appearance that is both glossy and matte can be realized at the outer surface of the wet-area device 100.

As described above, the first unevenness 11 of the first layer 10 is along the main part unevenness 41 of the main part 40. The average height Rc1 of the first unevenness 11 is less than the average length RSm1 of the first unevenness 11. That is, the average value of the depths (the heights) of the multiple recesses 11a included in the first unevenness 11 is less than the average value of the widths of the multiple recesses 11a included in the first unevenness 11.

The average height Rc1 of the first unevenness 11 is, for example, greater than 0.7 μm, and favorably greater than 0.7 μm and less than 4.4 μm. The average length RSm1 of the first unevenness 11 is, for example, not less than 40 μm and not more than 200 μm, and favorably greater than 55.0 μm and less than 105.9 μm. The ratio (Rc1/RSm1) of the average height Rc1 of the first unevenness 11 to the average length RSm1 of the first unevenness 11 is, for example, greater than 0.01 and less than 0.05.

By setting the average height Rc1 of the first unevenness 11 to be in this range, the height of the unevenness of the outer surface of the wet-area device 100 can be prevented from becoming too large or too small. Thereby, a moderate glossy appearance (gloss) can remain while suppressing the glossy appearance of the outer surface by matting.

It is favorable for the ratio (Rc1/RSm1) of the average height Rc1 of the first unevenness 11 to the average length RSm1 of the first unevenness 11 to be greater than 0.013 and less than 0.042, and more favorably not less than 0.016 and not more than 0.037.

By setting the ratio of the average height Rc1 of the first unevenness 11 to the average length RSm1 of the first unevenness 11 to be in this range, the height of the unevenness of the outer surface of the wet-area device 100 can be further prevented from becoming too large or too small. Thereby, an appearance that is both glossy and matte can be realized at the outer surface of the wet-area device 100.

The average height Rc4 of the main part unevenness 41 is, for example, greater than the thickness T1 of the first layer 10 (referring to FIG. 2). Thus, by setting the average height Rc4 of the main part unevenness 41 to be greater than the thickness T1 of the first layer 10, the first unevenness 11 can be formed better along the main part unevenness 41. Thereby, it is easy to adjust the glossy appearance of the outer surface in a moderate range.

A method for manufacturing the wet-area device 100 according to the first embodiment will now be described.

Figure 5A:
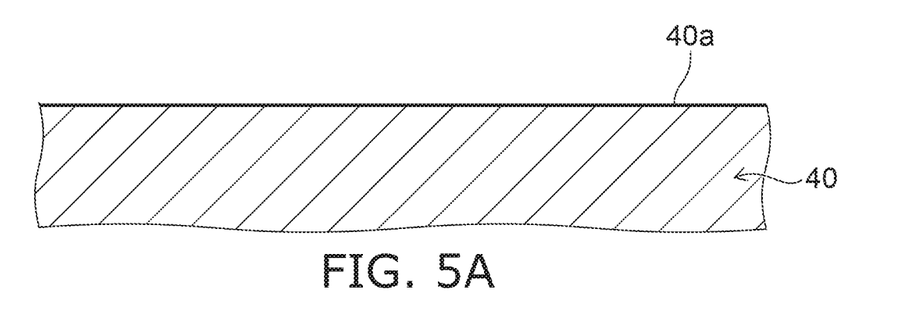
FIGS. 5A to 5C are cross-sectional views schematically illustrating the method for manufacturing the wet-area device according to the first embodiment.
Figure 5B:
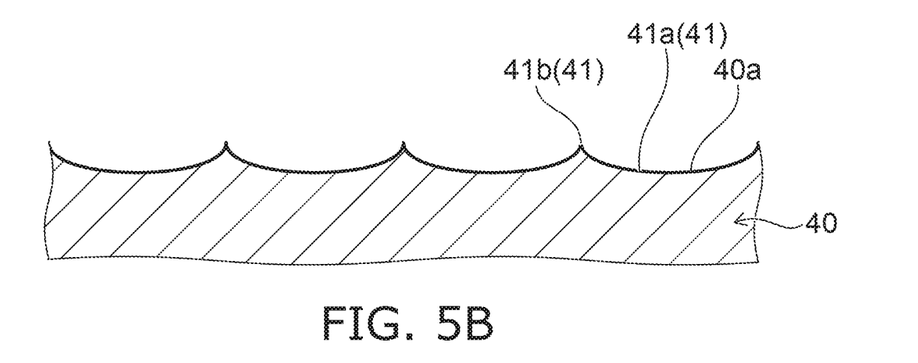
Figure 5C:
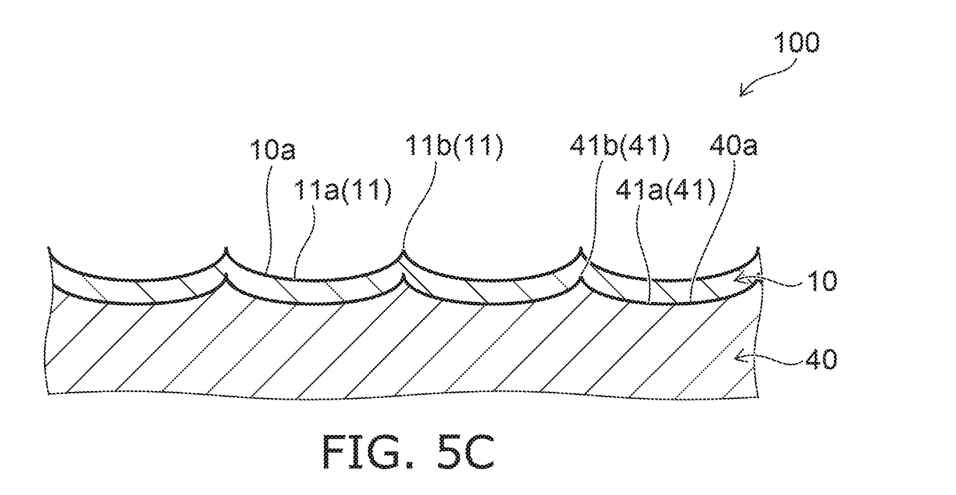

FIGS. 5A to 5C are cross-sectional views schematically illustrating the method for manufacturing the wet-area device according to the first embodiment.

In the method for manufacturing the wet-area device according to the first embodiment, first, the main part 40 that is made of metal is prepared as illustrated in FIG. 5A. Then, as illustrated in FIG. 5B, the main part unevenness 41 that includes the multiple recesses 41a and the multiple protrusions 41b is formed in the outer surface 40a side of the main part 40 by shot blasting the outer surface 40a of the main part 40 (an unevenness formation process).

In the unevenness formation process, the average height Rc4 of the main part unevenness 41 is set to be less than the average length RSm4 of the main part unevenness 41. For example, the average height Rc4 of the main part unevenness 41 and the average length RSm4 can be adjusted by modifying the processing conditions of the shot blasting. More specifically, the average height Rc4 of the main part unevenness 41 and the average length RSm4 can be adjusted by modifying the particle size of the blasting media (the grain) and/or the rate (the pressure of the air) at which the blasting media is projected.

Then, as illustrated in FIG. 5C, the first layer 10 is formed on the outer surface 40a of the main part 40 (a first layer formation process). In the example, the first layer 10 includes chromium carbonitride and is formed by, for example, chemical vapor deposition (CVD), physical vapor deposition (PVD), sputtering, etc. The first layer formation process forms the first layer 10 so that the first unevenness 11 that includes the multiple recesses 11a and the multiple protrusions 11b is formed along the main part unevenness 41 in the outer surface 10a side of the first layer 10.

Thus, by forming the main part unevenness 41 in the main part 40 and by forming the first unevenness 11 along the main part unevenness 41 in the first layer 10, the glossy appearance of the outer surface of the wet-area device 100 can be matted so as not to be too glossy. Also, by setting the average height Rc4 of the main part unevenness 41 to be less than the average length RSm4 of the main part unevenness 41, the glossy appearance of the outer surface of the wet-area device 100 can be matted so as not to be too glossy, and the height of the unevenness of the outer surface of the wet-area device 100 can be prevented from becoming too large. Thereby, a wet-area device can be provided in which the adhesion of grime due to the unevenness can be suppressed while suppressing the glossy appearance of the outer surface by matting.

As a means for forming the unevenness in the outermost surface of the wet-area device 100, for example, it may be considered to perform the unevenness formation process after the first layer formation process. However, there is a risk that cracks or the like may occur in the outer surface of the first layer 10 when shot blasting of the first layer 10 is performed.

Therefore, in the embodiment, the unevenness formation process is performed before the first layer formation process. Thereby, the matting can be performed so that a moderate glossy appearance remains in the outer surface of the wet-area device 100 while suppressing the occurrence of cracks, etc., in the outer surface of the wet-area device 100.

Figure 6:
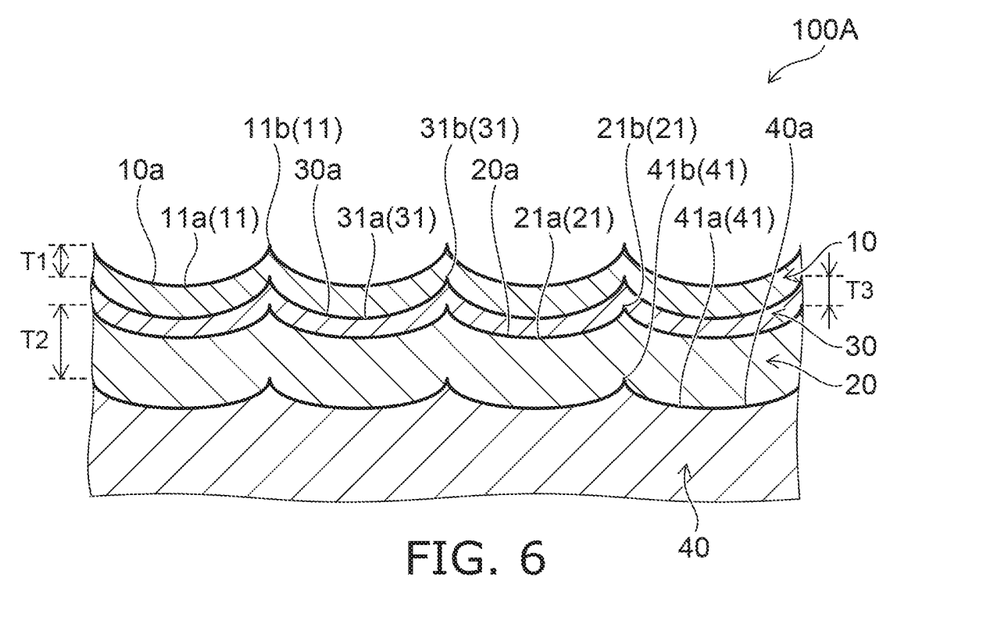
FIG. 6 is a cross-sectional view schematically illustrating the outer surface vicinity of a wet-area device according to a second embodiment.

FIG. 6 is a cross-sectional view schematically illustrating the outer surface vicinity of a wet-area device according to a second embodiment.

As illustrated in FIG. 6, the wet-area device 100A according to the second embodiment includes the main part 40, the first layer 10, the second layer 20, and the third layer 30.

In the example, the main part 40 includes, for example, a copper alloy such as brass or the like, stainless steel, etc. The main part 40 may include, for example, copper plating on the outer surface of a base made of zinc. The main part 40 includes the main part unevenness 41 in the outer surface 40a side.

The first layer 10 is the same as the first layer 10 of the first embodiment. The first layer 10 includes the first unevenness 11 in the outer surface 10a side. For example, the first layer 10 is positioned at the outermost surface.

The second layer 20 is provided between the main part 40 and the first layer 10 in the stacking direction. That is, the second layer 20 is provided on the outer surface 40a of the main part 40 and under the outer surface 10a of the first layer 10. In other words, the second layer 20 is provided outward of the outer surface 40a of the main part 40 and inward of the outer surface 10a of the first layer 10. The second layer 20 is stacked in the same direction as the first layer 10.

When the second layer 20 is provided, the second layer 20 may be directly provided on the outer surface 40a of the main part 40 or may be indirectly provided on the outer surface 40a of the main part 40 with another layer interposed. That is, the second layer 20 may contact the outer surface 40a of the main part 40 or may not contact the outer surface 40a of the main part 40. In the example, the second layer 20 contacts the outer surface 40a of the main part 40.

For example, the second layer 20 is made of metal. The second layer 20 includes, for example, nickel, copper, etc. The hardness of the second layer 20 is less than the hardness of the first layer 10. For example, the hardness of the first layer 10 and the hardness of the second layer 20 can be measured by a measurement method conforming to JIS Z 2244:2009. The corrosion resistance of the wet-area device 100 can be improved by providing the second layer 20. The second layer 20 is provided as necessary and is omissible.

The second layer 20 includes the second unevenness 21 in an outer surface 20a side. The second unevenness 21 is provided at a side of the outer surface 20a of the second layer 20. The second unevenness 21 includes multiple recesses 21a (second recesses) and multiple protrusions 21b (second protrusions). The recesses 21a of the second unevenness 21 are recessed in the stacking direction. The protrusions 21b of the second unevenness 21 protrude in the stacking direction.

The second unevenness 21 is along the main part unevenness 41. The second unevenness 21 is arranged along the main part unevenness 41. In other words, the second unevenness 21 follows the main part unevenness 41. That is, the recesses 21a of the second unevenness 21 overlap the recesses 41a of the main part unevenness 41 in the stacking direction. Also, the protrusions 21b of the second unevenness 21 overlap the protrusions 41b of the main part unevenness 41 in the stacking direction.

Thus, when the second layer 20 is provided, the first unevenness 11 can reflect the main part unevenness 41 via the second unevenness 21 because the second layer 20 includes the second unevenness 21 along the main part unevenness 41; therefore, the glossy appearance of the outer surface of the wet-area device 100 can be matted so as not to be too glossy.

The third layer 30 is provided between the second layer 20 and the first layer 10 in the stacking direction. That is, the third layer 30 is provided on the outer surface 20a of the second layer 20 and under the outer surface 10a of the first layer 10. In other words, the third layer 30 is provided outward of the outer surface 20a of the second layer 20 and inward of the outer surface 10a of the first layer 10. The third layer 30 is stacked in the same direction as the first layer 10 and the second layer 20.

When the third layer 30 is provided, the third layer 30 may be directly provided on the outer surface 20a of the second layer 20 or may be indirectly provided on the outer surface 20a of the second layer 20 with another layer interposed. That is, the third layer 30 may contact the outer surface 20a of the second layer 20 or may not contact the outer surface 20a of the second layer 20. In the example, the third layer 30 contacts the outer surface 20a of the second layer 20.

When the third layer 30 is provided but the second layer 20 is not provided, the third layer 30 may be directly provided on the outer surface 40a of the main part 40 or may be indirectly provided on the outer surface 40a of the main part 40 with another layer interposed. That is, the third layer 30 may contact the outer surface 40a of the main part 40 or may not contact the outer surface 40a of the main part 40.

For example, the third layer 30 is made of metal. The third layer 30 includes, for example, chrome, nickel, a tin-cobalt alloy, gold, etc. By providing the third layer 30, the wear resistance of the wet-area device 100 can be improved, and the outer surface of the wet-area device 100 can be provided with metallic luster. The third layer 30 is provided as necessary and is omissible.

The third layer 30 includes the third unevenness 31 in an outer surface 30a side. The third unevenness 31 is provided at a side of the outer surface 30a of the third layer 30. The third unevenness 31 includes multiple recesses 31a (third recesses) and multiple protrusions 31b (third protrusions). The recesses 31a of the third unevenness 31 are recessed in the stacking direction. The protrusions 31b of the third unevenness 31 protrude in the stacking direction.

The third unevenness 31 is along the main part unevenness 41. The third unevenness 31 is arranged along the main part unevenness 41. In other words, the third unevenness 31 follows the main part unevenness 41. That is, the recesses 31a of the third unevenness 31 overlap the recesses 41a of the main part unevenness 41 in the stacking direction. Also, the protrusions 31b of the third unevenness 31 overlap the protrusions 41b of the main part unevenness 41 in the stacking direction. In the example, the third unevenness is along the main part unevenness 41 via the second unevenness 21.

Thus, when the third layer 30 is provided, the first unevenness 11 can reflect the main part unevenness 41 via the third unevenness 31 because the third layer 30 includes the third unevenness 31 along the second unevenness 21; therefore, the adhesion of grime due to the unevenness can be suppressed while suppressing the glossy appearance of the outer surface by matting.

A thickness T3 of the third layer 30 is, for example, less than a thickness T2 of the second layer 20. Thus, by setting the thickness T3 of the third layer 30 to be less than the thickness T2 of the second layer 20, the third unevenness 31 can be formed better along the second unevenness 21. Thereby, it is easy to adjust the glossy appearance of the outer surface in a moderate range.

The thickness T1 of the first layer 10 is, for example, greater than the thickness T3 of the third layer 30. The thickness T2 of the second layer 20 is, for example, greater than the thickness T1 of the first layer 10.

More specifically, the thickness T1 of the first layer 10 is, for example, not less than 0.1 μm and not more than 3.0 μm (e.g., about 1 μm). The thickness T2 of the second layer 20 is, for example, not less than 2 μm and not more than 30 μm. The thickness T3 of the third layer 30 is, for example, not less than 0.1 μm and not more than 2.0 μm (e.g., about 0.5 μm).

When the second layer 20 is provided, it is sufficient for the second layer 20 to be provided on at least a portion of the outer surface 40a of the main part 40, and it is favorable to be provided on the entire surface of the outer surface 40a of the main part 40. When the third layer 30 is provided, it is sufficient for the third layer 30 to be provided on at least a portion of the outer surface 20a of the second layer 20, and it is favorable to be provided on the entire surface of the outer surface 20a of the second layer 20. When the first layer 10 is provided on the third layer 30, it is sufficient for the first layer 10 to be provided on at least a portion of the outer surface 30a of the third layer 30, and it is favorable to be provided on the entire surface of the outer surface 30a of the third layer 30.

When the second layer 20 is provided, it is sufficient for the second unevenness 21 to be provided in at least a portion of the outer surface 20a side of the second layer 20, and it is favorable to be provided in the entire surface on the outer surface 20a side of the second layer 20. When the third layer 30 is provided, it is sufficient for the third unevenness 31 to be provided in at least a portion of the outer surface 30a side of the third layer 30, and it is favorable to be provided in the entire surface on the outer surface 30a side of the third layer 30.

In the embodiment, a layer that includes chrome, nickel, a tin-cobalt alloy, gold, etc., also may be provided between the main part 40 and the second layer 20, between the second layer 20 and the third layer 30, and/or between the third layer 30 and the first layer 10. Even when such a layer is provided, by providing an unevenness in the outer surface side of this layer along the unevenness of the layer therebelow, the layer above this layer can reflect the main part unevenness 41 via the unevenness of this layer.

As described above, the average height Rc2 of the second unevenness 21 of the second layer 20 and the average height Rc3 of the third unevenness 31 of the third layer 30 can be calculated similarly to the average height Rc4 of the main part unevenness 41 (referring to FIG. 3 and Formula (1)). The average length RSm2 of the second unevenness 21 of the second layer 20 and the average length RSm3 of the third unevenness 31 of the third layer 30 can be calculated similarly to the average length RSm4 of the main part unevenness 41 (referring to FIG. 4 and Formula (2)).

The average height Rc2 of the second unevenness 21 is, for example, less than the average length RSm2 of the second unevenness 21. That is, the average value of the depths (the heights) of the multiple recesses 21a included in the second unevenness 21 is less than the average value of the widths of the multiple recesses 21a included in the second unevenness 21.

The average height Rc2 of the second unevenness 21 is, for example, 1 μm or more, and favorably not less than 1 μm and not more than 6.3 μm. The average length RSm2 of the second unevenness 21 is, for example, not less than 40 μm and not more than 200 μm, and favorably greater than 51.0 μm and less than 93.0 μm. The ratio (Rc2/RSm2) of the average height Rc2 of the second unevenness 21 to the average length RSm2 of the second unevenness 21 is, for example, greater than 0.01 and less than 0.05.

By setting the average height Rc2 of the second unevenness 21 to be in this range, when the second layer 20 is provided, the height of the unevenness of the outer surface of the wet-area device 100 can be prevented from becoming too large or too small. Thereby, a moderate glossy appearance (gloss) can remain while suppressing the glossy appearance of the outer surface by matting.

The average height Rc3 of the third unevenness 31 is, for example, less than the average length RSm3 of the third unevenness 31. That is, the average value of the depths (the heights) of the multiple recesses 31a included in the third unevenness 31 is less than the average value of the widths of the multiple recesses 31a included in the third unevenness 31.

The average height Rc3 of the third unevenness 31 is, for example, 1 µm or more, and favorably not less than 1 µm and not more than 6.3 µm. The average length RSm3 of the third unevenness 31 is, for example, not less than 40 µm and not more than 200 µm, and favorably greater than 51.0 µm and less than 93.0 µm. The ratio (Rc3/RSm3) of the average height Rc3 of the third unevenness 31 to the average length RSm3 of the third unevenness 31 is, for example, greater than 0.01 and less than 0.05.

By setting the average height Rc3 of the third unevenness 31 to be in this range, when the third layer 30 is provided, the height of the unevenness of the outer surface of the wet-area device 100 can be prevented from becoming too large or too small. Thereby, a moderate glossy appearance (gloss) can remain while suppressing the glossy appearance of the outer surface by matting.

A method for manufacturing the wet-area device 100 according to the second embodiment will now be described.

Figure 7A:
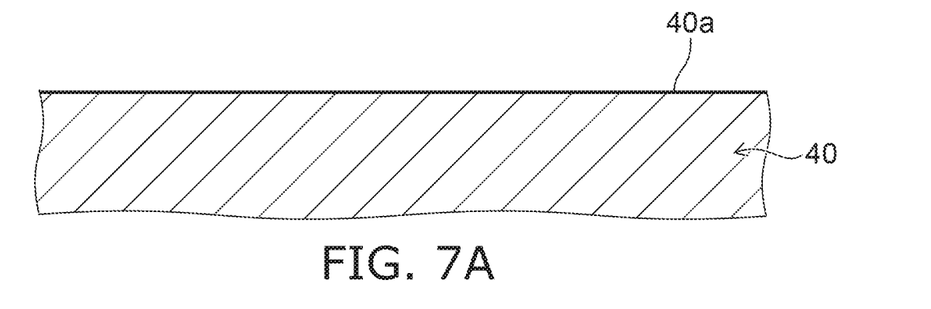
FIGS. 7A to 7C are cross-sectional views schematically illustrating the method for manufacturing the wet-area device according to the second embodiment.
Figure 7B:
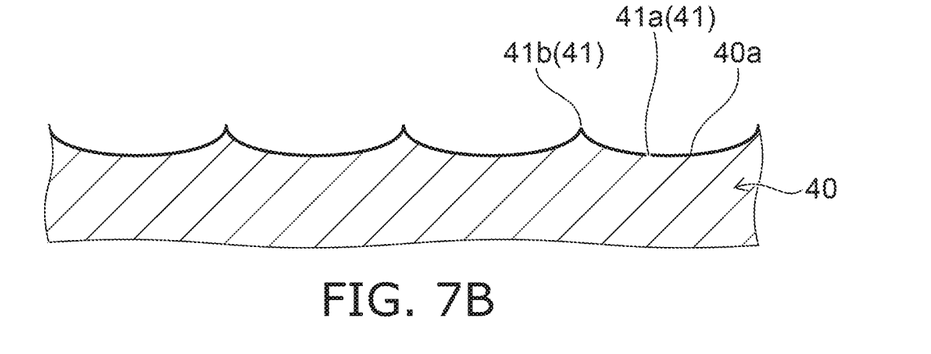
Figure 7C:
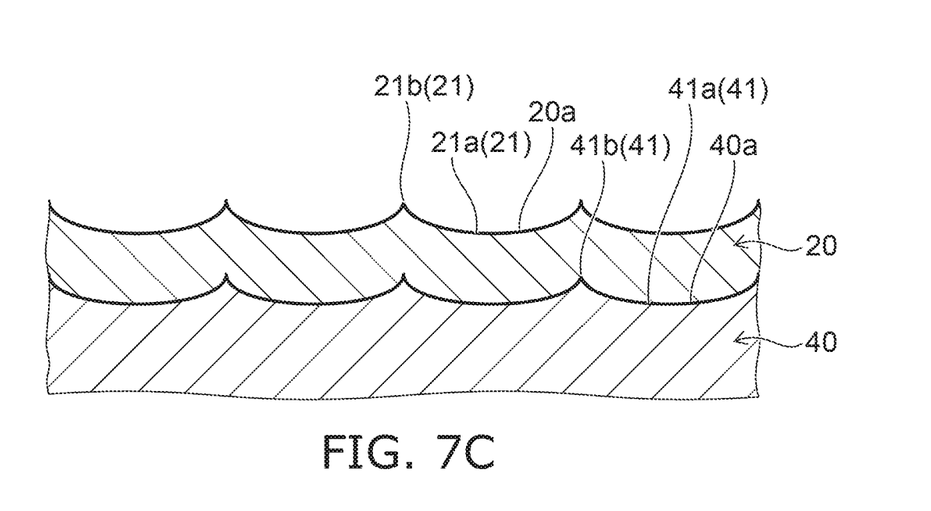

FIGS. 7A to 7C are cross-sectional views schematically illustrating the method for manufacturing the wet-area device according to the second embodiment.

Figure 8A:
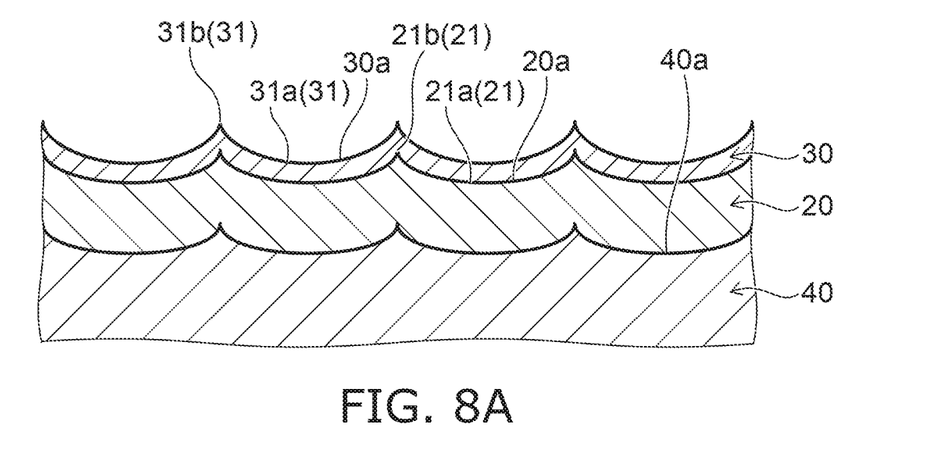
FIGS. 8A and 8B are cross-sectional views schematically illustrating the method for manufacturing the wet-area device according to the second embodiment.
Figure 8B:
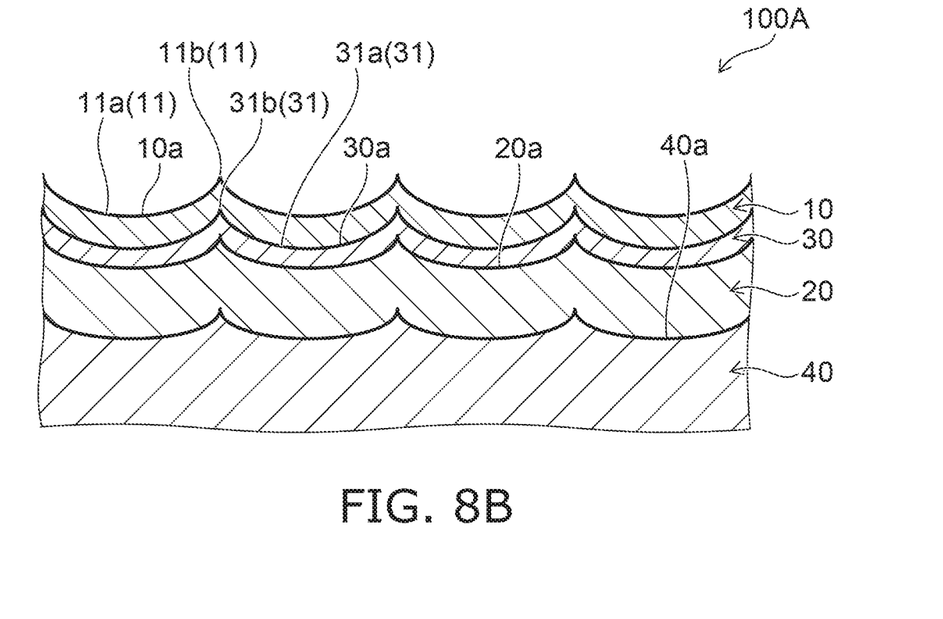

FIGS. 8A and 8B are cross-sectional views schematically illustrating the method for manufacturing the wet-area device according to the second embodiment.

In the method for manufacturing the wet-area device according to the second embodiment, first, the main part 40 that is made of metal is prepared as illustrated in FIG. 7A. Then, as illustrated in FIG. 7B, the main part unevenness 41 that includes the multiple recesses 41a and the multiple protrusions 41b is formed in the outer surface 40a side of the main part 40 by shot blasting the outer surface 40a of the main part 40 (the unevenness formation process). The unevenness formation process of the second embodiment can be performed similarly to the unevenness formation process of the first embodiment.

Then, as illustrated in FIG. 7C, the second layer 20 is formed on the outer surface 40a of the main part 40 (a second layer formation process). For example, the second layer 20 is formed by electroplating, etc. The second layer formation process forms the second layer 20 so that the second unevenness 21 includes the multiple recesses 21a and the multiple protrusions 21b and is formed along the main part unevenness 41 in the outer surface 20a side of the second layer 20. The second layer formation process is performed as necessary and is omissible.

Then, as illustrated in FIG. 8A, the third layer 30 is formed on the outer surface 20a of the second layer 20 (a third layer formation process). For example, the third layer 30 is formed by electroplating, etc. The third layer formation process forms the third layer 30 so that the third unevenness includes the multiple recesses 31a and the multiple protrusions 31b and is formed along the second unevenness in the outer surface 30a side of the third layer 30. The third layer formation process is performed as necessary and is omissible.

Continuing as illustrated in FIG. 8B, the first layer 10 is formed on the outer surface 30a of the third layer 30 (the first layer formation process). In the example, the first layer 10 includes chromium carbonitride and is formed by, for example, chemical vapor deposition (CVD), physical vapor deposition (PVD), sputtering, etc. The first layer formation process forms the first layer 10 so that the first unevenness 11 includes the multiple recesses 11a and the multiple protrusions 11b and is formed along the third unevenness 31 in the outer surface 10a side of the first layer 10.

Thus, even when the second layer 20 and the third layer 30 are provided between the main part 40 and the first layer 10, the first unevenness 11 can reflect the main part unevenness 41 via the second unevenness 21 and the third unevenness 31 because the second unevenness 21 is formed along the main part unevenness 41 in the second layer 20 and the third unevenness 31 is formed along the second unevenness 21 in the third layer 30; therefore, the glossy appearance of the outer surface of the wet-area device 100 can be matted so as not to be too glossy.

As a means for forming the unevenness in the outermost surface of the wet-area device 100, for example, it may be considered to perform the unevenness formation process after the first layer formation process or the third layer formation process. However, there is a risk that cracks or the like may occur in the outer surface of the first layer 10 and/or the third layer 30 when shot blasting the first layer 10 and/or the third layer 30.

Therefore, in the embodiment, the unevenness formation process is performed before the second layer formation process. Thereby, the matting can be performed so that a moderate glossy appearance remains in the outer surface of the wet-area device 100 while suppressing the occurrence of cracks, etc., in the outer surface of the wet-area device 100.

The inventors performed the following experiment for the relationship between the appearance, the main part unevenness 41, and the first unevenness 11. In the experiment, first, samples 1 to 19 that were made of the main part 40 were prepared. Then, the main part unevenness 41 was formed in the outer surface 40a of the main part 40 to have various average heights Rc and average lengths RSm by performing shot blasting with different processing conditions for each of the samples 1 to 19. After forming the main part unevenness 41 for the samples 1 to 19, the average height Rc4 of the main part unevenness 41, the average length RSm4, the ratio (Rc4/RSm4) of the average height Rc4 to the average length RSm4, and the glossiness were measured, and the existence of glossiness and matte in the appearance was determined by confirming the appearance with the naked eye. The results are shown in FIG. 9.

Figure 10:
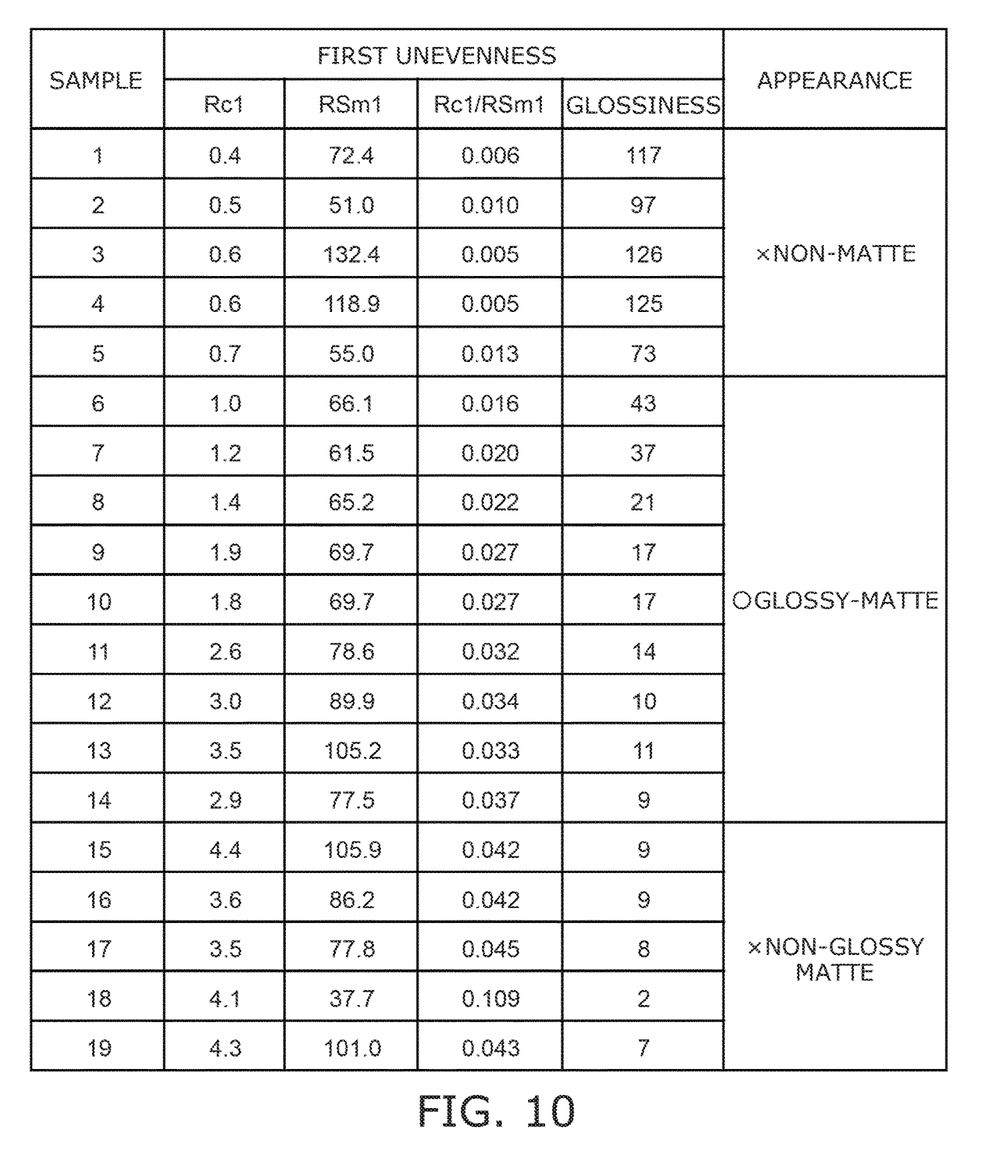
FIG. 10 is a table illustrating the experiment results.

Then, for each of the samples 1 to 19, the first layer 10 that included chromium carbonitride was formed by PVD on the outer surface 40a of the main part 40 in which the main part unevenness 41 was formed. After forming the first layer 10 for the samples 1 to 19, the average height Rc1 of the first unevenness 11, the average length RSm1, the ratio (Rc1/RSm1) of the average height Rc1 to the average length RSm1, and the glossiness were measured, and the existence of glossiness and matte in the appearance was determined by confirming the appearance with the naked eye.

The results are shown in FIG. 10.

Figure 9:
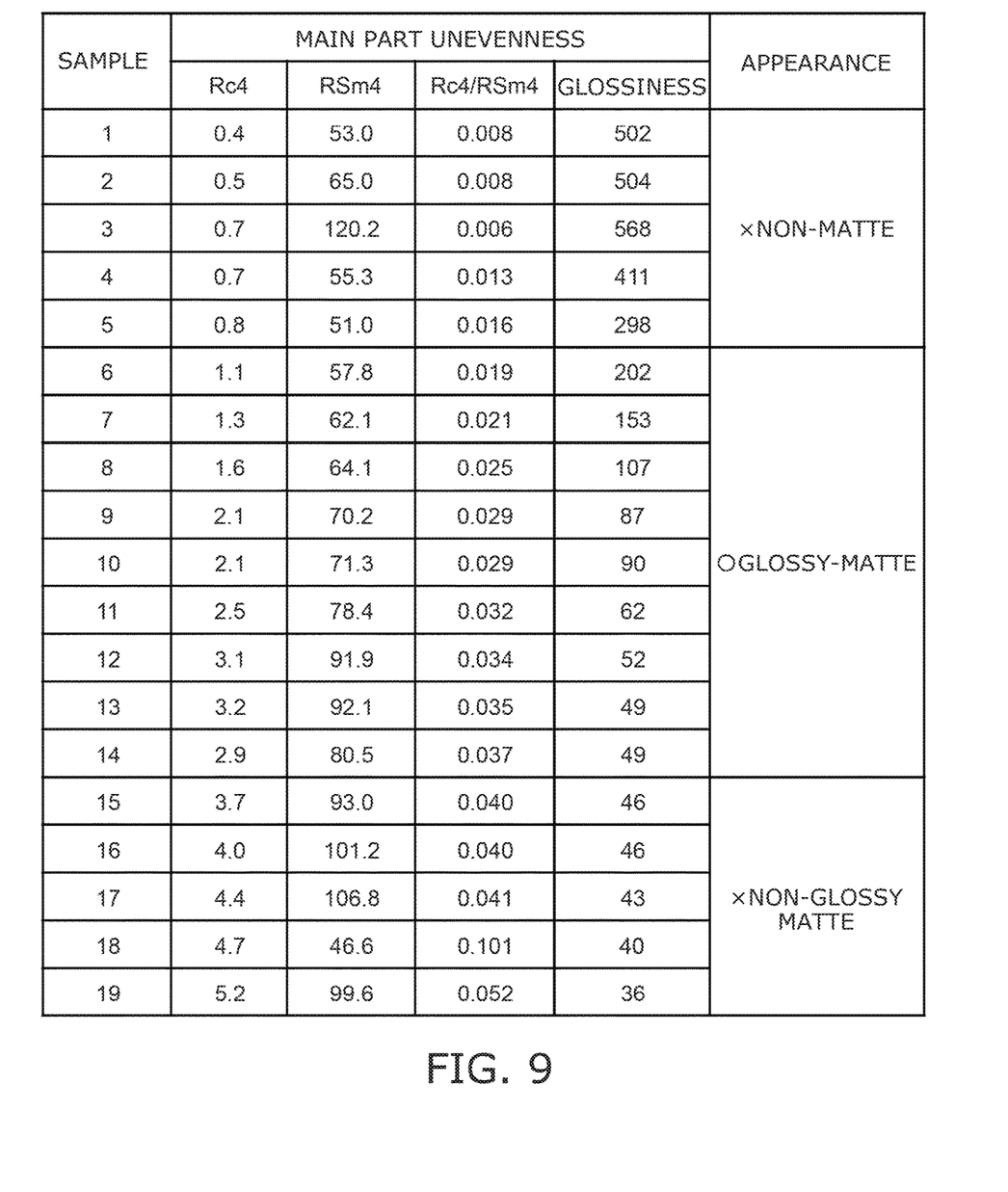
FIG. 9 is a table illustrating the experiment results.

FIGS. 9 and 10 are tables illustrating the experiment results.

For the appearance in FIGS. 9 and 10, "○" indicates an appearance that is both glossy and matte (glossy-matte), and "×" indicates a non-matte appearance (non-matte) or a non-glossy appearance (non-glossy matte).

As illustrated in FIGS. 9 and 10, in the samples 1 to 5, the ratio (Rc4/RSm4) of the average height Rc4 to the average length RSm4 of the main part unevenness 41 was 0.006 to 0.016, and the ratio (Rc1/RSm1) of the average height Rc1 to the average length RSm1 of the first unevenness 11 was 0.005 to 0.013. The appearances of samples 1 to 5 after the first layer 10 was formed were "non-matte", in which the appearance was glossy but was without matte.

As illustrated in FIGS. 9 and 10, in the samples 15 to 19, the ratio (Rc4/RSm4) of the average height Rc4 to the average length RSm4 of the main part unevenness 41 was 0.040 to 0.101, and the ratio (Rc1/RSm1) of the average height Rc1 to the average length RSm1 of the first unevenness 11 was 0.042 to 0.109. The appearances of the samples 15 to 19 after the first layer 10 was formed were "non-glossy matte", in which the appearance was matte but had no gloss.

Conversely, as illustrated in FIGS. 9 and 10, in the samples 6 to 14, the ratio (Rc4/RSm4) of the average height Rc4 to the average length RSm4 of the main part unevenness 41 was 0.019 to 0.037 (greater than 0.016 and less than 0.040), and the ratio (Rc1/RSm1) of the average height Rc1 to the average length RSm1 of the first unevenness 11 was 0.016 to 0.037 (greater than 0.013 and less than 0.042). The appearances of the samples 6 to 14 after the first layer 10 was formed were "glossy-matte", in which an appearance that is both glossy and matte existed.

According to the embodiments as described above, a wet-area device and a method for manufacturing a wet-area device can be provided in which the adhesion of grime due to the unevenness can be suppressed while suppressing the glossy appearance of the outer surface by matting.

Hereinabove, embodiments of the invention are described. However, the invention is not limited to these descriptions. Appropriate design modifications made by one skilled in the art for the embodiments described above also are within the scope of the invention to the extent that the features of the invention are included. For example, the configurations, the dimensions, the materials, the arrangements, the mounting methods, etc., of the components included in the wet-area device are not limited to those illustrated and can be modified appropriately.

Also, the components included in the embodiments described above can be combined within the limits of technical feasibility; and such combinations are within the scope of the invention to the extent that the features of the invention are included.

What is claimed is:

1. A wet-area device, comprising:
a main part made of metal; and
a first layer provided on an outer surface of the main part,
the main part including a main part unevenness at a side of the outer surface of the main part, the main part unevenness including a plurality of main part recesses and a plurality of main part protrusions,
the first layer including a first unevenness at a side of an outer surface of the first layer, the first unevenness including a plurality of first recesses and a plurality of first protrusions and being arranged along the main part unevenness,
an average height of the main part unevenness being less than an average length of the main part unevenness,
the average height of the main part unevenness being greater than 0.8 μm and less than 3.7 μm, and
a ratio of the average height of the main part unevenness to the average length of the main part unevenness being greater than 0.01 and less than 0.05.

2. The device according to claim 1, wherein the ratio of the average height of the main part unevenness to the average length of the main part unevenness is greater than 0.016 and less than 0.040.

3. The device according to claim 2, wherein
the ratio of the average height of the main part unevenness to the average length of the main part unevenness is not less than 0.019 and not more than 0.037.

4. The device according to claim 1, wherein
an average height of the first unevenness is greater than 0.7 μm, and
a ratio of the average height of the first unevenness to an average length of the first unevenness is greater than 0.01 and less than 0.05.

5. The device according to claim 4, wherein
the ratio of the average height of the first unevenness to the average length of the first unevenness is greater than 0.013 and less than 0.042.

6. The device according to claim 5, wherein
the ratio of the average height of the first unevenness to the average length of the first unevenness is not less than 0.016 and not more than 0.037.

7. The device according to claim 1, wherein
the average height of the main part unevenness is greater than a thickness of the first layer.

8. The device according to claim 1, further comprising:
a second layer provided between the main part and the first layer,
a hardness of the second layer being less than a hardness of the first layer,
the second layer including a second unevenness in an outer surface side of the second layer, the second unevenness including a plurality of recesses and a plurality of protrusions and being formed along the main part unevenness.

9. A method for manufacturing the wet-area device according to claim 1, the method comprising:
an unevenness formation process of forming the main part unevenness at the side of the outer surface of the main part by shot blasting the outer surface of the main part, the main part being made of metal, the main part unevenness including the plurality of main part recesses and the plurality of main part protrusions; and
a first layer formation process of forming the first layer on the outer surface of the main part where the main part unevenness is formed,
an average height of the main part unevenness being less than an average length of the main part unevenness in the unevenness formation process,
the first layer formation process forming the first layer so that the first unevenness includes the plurality of first recesses and the plurality of first protrusions and is arranged along the main part unevenness at the side of the outer surface of the first layer.

* * * * *

UNITED STATES PATENT AND TRADEMARK OFFICE
CERTIFICATE OF CORRECTION

PATENT NO. : 11,141,954 B2
APPLICATION NO. : 17/002957
DATED : October 12, 2021
INVENTOR(S) : Tomoki Baba et al.

It is certified that error appears in the above-identified patent and that said Letters Patent is hereby corrected as shown below:

In the Specification

Column 11, Line 49, "the third unevenness is" should be --the third unevenness 31 is--.

Signed and Sealed this
Twenty-fourth Day of May, 2022

Katherine Kelly Vidal
*Director of the United States Patent and Trademark Office*